United States Patent
Demir et al.

(10) Patent No.: US 12,493,758 B2
(45) Date of Patent: Dec. 9, 2025

(54) ADAPTIVE BIASING PROCEDURE TO INCREASE PA EFFICIENCY IN RFID READERS

(71) Applicant: ZEBRA TECHNOLOGIES CORPORATION, Lincolnshire, IL (US)

(72) Inventors: Alpaslan Demir, East Meadow, NY (US); Amit Asthana, Germantown, MD (US); Mark W. Duron, Mastic, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/618,997

(22) Filed: Mar. 27, 2024

(65) Prior Publication Data
US 2025/0225347 A1 Jul. 10, 2025

Related U.S. Application Data

(60) Provisional application No. 63/619,262, filed on Jan. 9, 2024.

(51) Int. Cl.
*G06K 7/10* (2006.01)
(52) U.S. Cl.
CPC ............................. *G06K 7/10207* (2013.01)

(58) Field of Classification Search
CPC .................................................. G06K 7/10207
USPC ................................................................ 235/451
See application file for complete search history.

(56) References Cited

U.S. PATENT DOCUMENTS

| | | | |
|---|---|---|---|
| 2015/0148095 A1* | 5/2015 | Shi | H04W 52/0229 330/296 |
| 2021/0104985 A1* | 4/2021 | Ng | H03F 1/0227 |
| 2022/0224373 A1* | 7/2022 | Pehlke | H03F 3/195 |

FOREIGN PATENT DOCUMENTS

JP 2022180789 A * 12/2022

* cited by examiner

*Primary Examiner* — Daniel A Hess

(57) ABSTRACT

Techniques for improving energy efficiency of a Radio-Frequency Identification (RFID) reader are described herein. A power control algorithm controlling a power amplifier of the RFID reader adjusts a bias setting of the power amplifier at different time periods during operation of the RFID reader. Particularly, in aspects, the power control algorithm biases the power amplifier at a first bias setting during a first time period when the RFID reader transmits a modulated continuous waveform conveying information to RFID tags in an environment, and biases the power amplifier at a second, different bias setting during a second time period when the RFID reader transmits an unmodulated continuous waveform. By adjusting to the second bias setting, the power control algorithm improves energy/power efficiency of the RFID reader during the second time period, thereby extending the single-charge lifetime of the RFID reader when implemented as a battery powered unit.

14 Claims, 7 Drawing Sheets

ADAPTIVE BIASING PROCEDURE TO INCREASE PA EFFICIENCY IN RFID READERS

CROSS-REFERENCE TO RELATED APPLICATIONS

This application claims priority to, and the benefit of the filing date of, U.S. Provisional Application No. 63/619,262, filed Jan. 9, 2024 and entitled "Adaptive Biasing Procedure to Increase PA Efficiency in RFID Readers," the entirety of which is hereby incorporated by reference herein.

FIELD OF THE DISCLOSURE

The present disclosure relates to Radio-Frequency Identification (RFID) systems, and more particularly to energy efficiency of a power amplifier in an RFID reader.

BACKGROUND

Radio-Frequency Identification (RFID) systems use radio wave communications to identify and/or track RFID tags affixed to objects. More particularly, an antenna of an RFID reader (sometimes referred to as an "interrogator") transmits an interrogation signal that is received by an RFID tag within range of the reader. The RFID tag, after receiving the interrogation signal, uses an antenna therein to transmit a response signal, which contains information identifying the RFID tag and/or the object to which the RFID tag is attached. Accordingly, the exchange of radio-frequency signals between the RFID reader and tag enable the RFID reader to detect and obtain information regarding various objects in an environment when respective RFID tags are affixed thereto. RFID systems have seen a wide array of implementations, including but not limited to inventory management and tracking systems in which an RFID reader is used to identify and track the locations of respective objects (e.g., products) in a manufacturing, shipping, storage and/or retail environment.

An RFID reader may be implemented as a battery powered, handheld unit carried by a human operator or another transport mechanism. A handheld RFID reader may have limited battery life after charging, with battery depletion largely being credited to the transmission of the interrogation signal to RFID tags during operation (and the subsequent follow-up communications with detected RFID tags). Inefficient use of energy by the RFID reader increases the rate of depletion of the RFID battery, thereby reducing the duration of operation of the RFID reader on a single charge and/or requiring a larger RFID reader to accommodate a higher capacity battery to produce the same single-charge battery lifetime. Moreover, energy usage by the RFID reader is accompanied by dissipation of heat from the RFID reader. Thus, inefficient energy usage by the RFID reader limits the practicability of a battery powered RFID reader in many targeted fields of use that involve human operators (and/or other carriers) carrying an RFID reader around an environment for hours at a time without pausing to charge the RFID reader.

SUMMARY

In some aspects, an assembly is provided. The assembly may include a power amplifier, a transceiver, one or more processors, and one or more memories communicatively coupled to the one or more processors. The one or more memories store instructions that, when executed by the one or more processors, cause the assembly to (1) transmit, by the transceiver, a first signal to a receiver device during a first time period while the power amplifier is biased at a first bias setting, (2) adjust, by a power control algorithm during a second time period that is different than the first time period, the first bias setting to a second bias setting that is different from the first bias setting, and/or (3) transmit, by the transceiver, a second signal to the receiver device during the second time period while the power amplifier is biased at the second bias setting.

In some aspects, the first signal is a modulated continuous waveform, and the second signal is an unmodulated continuous waveform.

In some aspects, the instructions, when executed by the one or more processors, further cause the assembly to (4) responsive to transmitting the second signal to the receiver device, adjust, by the power control algorithm during a third time period that is different than the first time period and the second time period, the second bias setting to the first bias setting, (5) transmit, by the transceiver, a third signal to the receiver device during the third time period while the power amplifier is biased at the first bias setting, and/or (6) responsive to completing transmission of the third signal to the receiver device, adjust, by the power control algorithm during a fourth time period that is different than the first time period, the second time period, and the third time period, the first bias setting to the second bias setting.

In some aspects, the instructions, when executed by the one or more processors, further cause the assembly to (4) track, via the clock generation circuit, the first time period and the second time period to identify respective transition points of the first time period and the second time period, (5) responsive to identifying a first transition point of the first time period to the second time period, cause, by the clock generation circuit, the power control algorithm to adjust the first bias setting to the second bias setting, (6) responsive to identifying a second transition point of the second time period to a third time period, cause, by the clock generation circuit, the power control algorithm to adjust the second bias setting to the first bias setting, and/or (7) transmit, by the transceiver, a third signal to the receiver device during the third time period while the power amplifier is biased at the first bias setting.

In some aspects, the assembly further includes an attenuator with an anti-smoothing filter, and an adaptive biasing circuit with a smoothing filter. In these aspects, the instructions, when executed by the one or more processors, further cause the assembly to adjust, by the power control algorithm, the first bias setting to the second bias setting by increasing, by the smoothing filter, a first biasing level of the adaptive biasing circuit, and by decreasing, by the anti-smoothing filter, a second biasing level of the attenuator. Moreover, in some aspects, the assembly still further includes a power detector, and the instructions, when executed by the one or more processors, further cause the assembly to adjust, by the power control algorithm, the first bias setting to the second bias setting by receiving, from the power detector, an output power measurement of the power amplifier at the first bias setting, and by adjusting, by the anti-smoothing filter, the second biasing level of the attenuator to maintain the output power measurement of the power amplifier while biased at the second bias setting.

In some other aspects, the assembly further includes an attenuator with an anti-smoothing filter, and an adaptive biasing circuit with a smoothing filter. In these aspects, the instructions, when executed by the one or more processors, further cause the assembly to adjust, by the power control algorithm, the first bias setting to the second bias setting by decreasing, by the smoothing filter, a first biasing level of the adaptive biasing circuit, and by increasing, by the anti-smoothing filter, a second biasing level of the attenuator. Moreover, in some aspects, the assembly still further includes a power detector, and the instructions, when executed by the one or more processors, further cause the assembly to adjust, by the power control algorithm, the first bias setting to the second bias setting by receiving, from the power detector, an output power measurement of the power amplifier at the first bias setting, and by adjusting, by the anti-smoothing filter, the second biasing level of the attenuator to maintain the output power measurement of the power amplifier while biased at the second bias settings.

In some aspects, the assembly includes one or more of (i) a dynamic load-line module, (ii) a dynamic voltage matching module, and/or (iii) a dynamic voltage filtering module to perform at least one of (a) output impedance matching, (b) harmonic rejection, or (c) antenna port impedance matching.

In some aspects, a method is provided. The method may include (1) transmitting, by a transceiver, a first signal to a receiver device during a first time period while a power amplifier is biased at a first bias setting, (2) adjusting, by a power control algorithm during a second time period that is different than the first time period, the first bias setting to a second bias setting that is different from the first bias setting; and/or (3) transmitting, by the transceiver, a second signal to the receiver device during the second time period while the power amplifier is biased at the second bias setting.

In some aspects, the first signal in the method is a modulated continuous waveform and the second signal is an unmodulated continuous waveform.

In some aspects, the method further includes (4) responsive to transmitting the second signal to the receiver device, adjusting, by the power control algorithm during a third time period that is different than the first time period and the second time period, the second bias setting to the first bias setting, (5) transmitting, by the transceiver, a third signal to the receiver device during the third time period while the power amplifier is biased at the first bias setting, and/or (6) responsive to completing transmission of the third signal to the receiver device, adjusting, by the power control algorithm during a fourth time period that is different than the first time period, the second time period, and the third time period, the first bias setting to the second bias setting.

In some aspects, the method further includes (4) tracking, via a clock generation circuit, the first time period and the second time period to identify respective transition points of the first time period and the second time period, (5) responsive to identifying a first transition point of the first time period to the second time period, causing, by the clock generation circuit, the power control algorithm to adjust the first bias setting to the second bias setting, (6) responsive to identifying a second transition point of the second time period to a third time period, causing, by the clock generation circuit, the power control algorithm to adjust the second bias setting to the first bias setting, and/or (7) transmitting, by the transceiver, a third signal to the receiver device during the third time period while the power amplifier is biased at the first bias setting.

In some aspects, the method further includes adjusting, by the power control algorithm, the first bias setting to the second bias setting by increasing, by a smoothing filter, a first biasing level of an adaptive biasing circuit, and by decreasing, by an anti-smoothing filter, a second biasing level of an attenuator. In these aspects, the method may still further include adjusting, by the power control algorithm, the first bias setting to the second bias setting by receiving, from a power detector, an output power measurement of the power amplifier at the first bias setting, and by adjusting, by the anti-smoothing filter, the second biasing level of the attenuator to maintain the output power measurement of the power amplifier while biased at the second bias setting.

In some aspects, the method further includes adjusting, by the power control algorithm, the first bias setting to the second bias setting by decreasing, by the smoothing filter, a first biasing level of an adaptive biasing circuit, and by increasing, by the anti-smoothing filter, a second biasing level of an attenuator. In these aspects, the method may still further include adjusting, by the power control algorithm, the first bias setting to the second bias setting by receiving, from a power detector, an output power measurement of the power amplifier at the first bias setting, and by adjusting, by the anti-smoothing filter, the second biasing level of the attenuator to maintain the output power measurement of the power amplifier while biased at the second bias setting.

In some aspects, the method further includes performing, by one or more of: (i) a dynamic load-line module, (ii) a dynamic voltage matching module, or (iii) a dynamic voltage filtering module, at least one of (a) output impedance matching, (b) harmonic rejection, or (c) antenna port impedance matching.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
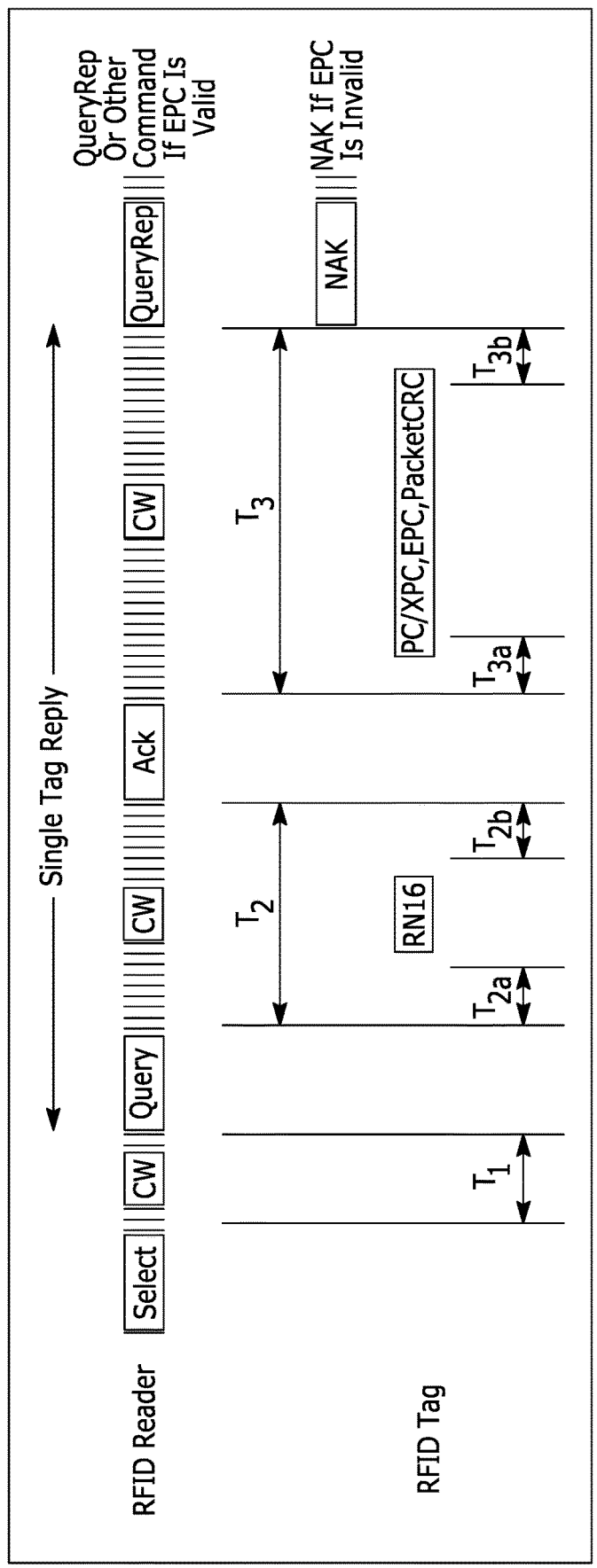
FIG. 1 depicts an example process of communications between a Radio-Frequency Identification (RFID) reader and RFID tag, in accordance with various embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, Radio-Frequency Identification systems are utilized in a variety of environments, for example to detect and/or track locations of objects in a manufacturing, shipping, storage, and/or retail environment. An RFID reader may be implemented as a battery powered handheld unit and transmits an interrogation signal that is detected by an RFID tag affixed to an object (or by multiple RFID tags affixed to respective objects). The RFID tag responds to a received interrogation signal with a response signal that includes information identifying the RFID tag and/or the object to which the RFID tag is affixed. Thus, using the identifying information, the RFID reader (and/or another computing device communicatively connected thereto, e.g., an operator's smartphone) may obtain, manipulate and/or display information associated with detected RFID tags and objects in an environment. A duration of time (or "period") from the transmitting of the interrogation signal to the successful receipt of the identifying information at the RFID reader is referred to herein as an RFID reader processing cycle (or "processing cycle," for short).

The present disclosure identifies inefficiencies in energy usage by the RFID reader, and presents techniques by which energy efficiency of the RFID reader is improved.

Particularly, the present disclosure identifies that, in traditional implementations, a power amplifier (PA) traditionally uses a same bias setting throughout the RFID processing cycle (e.g., a same voltage bias or current bias) to amplify a waveform for transmission by the RFID reader via an antenna. This processing cycle includes portions thereof during which the RFID reader transmits the interrogation cycle and other information involved in the processing cycle, typically through modulation of a continuous waveform (CW, also referred to herein as a "carrier signal") to encode information in the modulated CW. The processing cycle, however, also includes portions during which the RFID reader transmits the CW without modulation ("unmodulated CW") and without encoding meaningful information therein (e.g., while awaiting responses from one or more nearby RFID tags). Traditionally, transmission of meaningful information using the modulated CW amounts to approximately 20% of the processing cycle, with the remaining 80% of the processing cycle being the transmission of the unmodulated CW. Energy usage by the RFID reader is largely credited to the transmissions, and thus, the present disclosure identifies that transmitting components of the RFID reader traditionally use energy at a substantially similar rate regardless of whether the RFID reader is transmitting meaningful information.

Via techniques presented herein, a power control algorithm of the RFID reader adjusts the bias setting of the power amplifier (e.g., a voltage bias or a current bias) depending on whether the RFID reader transmits the information-bearing modulated CW or the unmodulated CW. That is, during a first time period(s) in which the RFID reader transmits the information-bearing modulated CW (a "transmit (Tx) mode"), the power control algorithm causes the power amplifier to be biased at a first bias setting. During a second, different time period(s) in which the RFID reader transmits the unmodulated CW (a "receive (Rx) mode," e.g., while the RFID reader awaits a response from an RFID tag), the power control algorithm causes the power amplifier to be biased at a second bias setting that is different from the first bias setting, to still achieve a substantially same target output power in the first and second time periods (e.g., 30 decibel-milliwatts (dBm)). More particularly, in aspects herein, the first bias setting is a higher biasing voltage (e.g., 5 Volts (V)), and the second bias setting is a lower biasing voltage (e.g., 3 V). Using the lower bias setting during the second time period(s), the power amplifier achieves the same output power throughout the RFID reader processing cycle but decreases the rate of energy usage by the RFID reader during the second time period(s).

By reducing the rate of energy usage (or "power consumption") during the second time period(s), an RFID reader using the techniques of the present disclosure operates more efficiently by using less energy over a processing cycle, as compared to RFID readers operating according to traditional techniques. Thus, when implemented in a battery powered RFID reader, the techniques of this disclosure allow the RFID reader to operator for longer on a single charge, and/or to use a smaller (and hence, lighter) battery as compared to traditional RFID readers. Additionally, reducing power consumption decreases heat dissipation by the RFID reader (regardless of whether the RFID reader is battery powered or running via a wired power source). Thus, the techniques of this disclosure improve the practicability of RFID readers in desired fields of use, especially when implemented in battery powered handheld units.

Example Waveform Modulation and Signal Transmissions by RFID Reader

Figure 2:
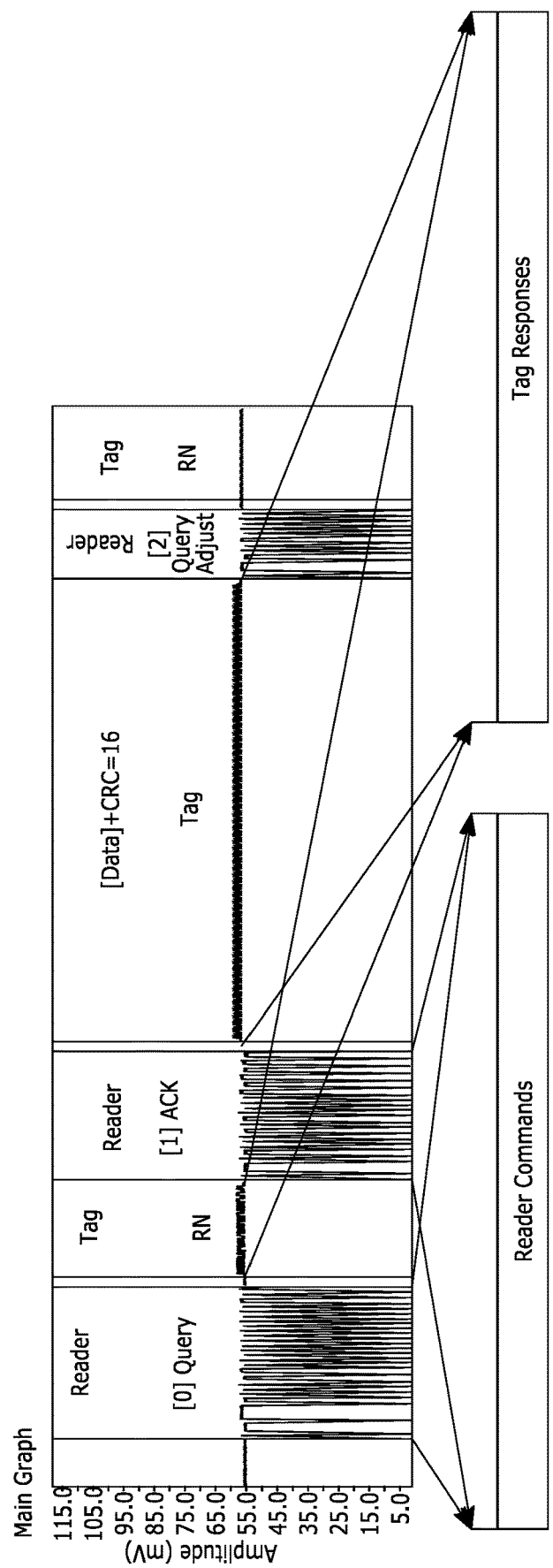
FIG. 2 depicts example wave modulation in communications between an RFID reader and an RFID tag, in accordance with various embodiments described herein.

FIGS. 1 and 2 depict example modulation and transmission of signals by an RFID reader, to demonstrate technical problems and solutions of the present disclosure.

Particularly, FIG. 1 depicts example signal transmissions among an RFID reader (sometimes referred to as an "Interrogator") and an RFID tag during an example processing cycle and other operations of the RFID reader over a duration of time proceeding along the horizontal axis. The example processing cycle is a "Single Tag Reply" involving one RFID tag responding to the RFID reader, but it should be appreciated that two, three, four or more RFID tags may communicate with the RFID reader over any given processing cycle, in contemplated aspects.

Before the processing cycle for a given RFID tag, the RFID reader may implement a "Select" command that allows the RFID reader to select a subpopulation of RFID tags for detection based on any desired criteria, e.g., to define any subset up to the entirety of RFID tags that an operator does or does not want to detect. After the Select command but still before the processing cycle, a time period $T_1$ elapses, which may be at least the minimum time between commands by the RFID reader (e.g., two milliseconds (ms)).

As depicted in FIG. 1, the processing cycle begins with the RFID reader transmitting an interrogation signal (encoding a "Query") to which nearby tags are to reply. After transmitting the interrogation signal, the RFID reader awaits a response from the RFID tag during a time period $T_2$. During the time period $T_2$, the RFID tag receives and is energized by the interrogation signal after the time period $T_{2a}$, and replies to the interrogation signal with a random or pseudo-random 16-bit number (RN16) by backscattering the interrogation signal. Upon receiving the RN16 reply after a time period $T_{2b}$, the RFID reader transmits another signal encoding an acknowledgement (ACK) of the RN16 by echoing the RN16.

The RFID reader awaits identifying information from the RFID tag during a time period $T_3$. Particularly, during the time period $T_3$, the RFID tag receives the acknowledgment signal after a time period $T_{3a}$, and replies by transmitting another signal encoding the identifying information for the RFID tag ("identifying signal," e.g., encoding a protocol control or extended protocol control (PC/XPC), an electronic product code (EPC), and/or a cyclic-redundancy check code (PacketCRC)). The RFID reader receives the identifying signal after a time period $T_{3b}$.

The processing cycle concludes upon the end of the time period $T_3$. Particularly, after receiving the identifying information, the RFID reader implements a QueryRep command or another command if the received identifying information (e.g., EPC) is valid, or a negative acknowledgment (NAK) if the identifying information is invalid.

As depicted in FIG. 1, during the time periods $T_1$, $T_2$, and $T_3$, the RFID reader transmits an unmodulated continuous waveform (CW), e.g., a sinusoidal or other waveform having a constant amplitude and frequency and thus not encoding information. By contrast, to transmit information encoding signals, the RFID reader modulates the amplitude and/or frequency of the CW to encode information for receipt by the RFID tag (e.g., the Query, Ack, QueryRep, etc.). FIG. 2 depicts a graph of signal amplitude to further illustrate these phenomena. During the transmission of reader commands ("READER"), the transmitted signal amplitude varies (i.e., is modulated) to encode information. While the RFID reader awaits a response from an RFID tag (TAG, e.g., while the RFID tag transmits its replies), the signal amplitude from the RFID does not change.

Throughout the RFID reader processing cycle, the RFID reader produces a same power output as measured at a transmitting antenna port of the RFID reader (e.g., 30 dBm), regardless of whether the RFID reader is transmitting the modulated CW or the unmodulated CW. This power output is produced via a power amplifier of the RFID reader, which increases the magnitude of an input signal and which traditionally operates using a same bias setting over the entirety of the processing cycle (i.e., without regard to whether or not the RFID reader is transmitting a modulated CW encoding information).

Techniques of this disclosure include a power control algorithm biasing the power amplifier at different bias settings depending on whether the RFID reader is transmitting the modulated CW (in a Tx mode) or transmitting the unmodulated CW (in an Rx mode during which the RFID reader awaits an RFID tag response). For example, referring back to FIG. 1, a power control algorithm of the RFID reader, using the RFID reader's own awareness of whether or not the RFID reader is transmitting encoded signals at any given time, may bias the power amplifier at a first, higher bias setting (e.g., 5 V) during transmission of the Select, Query, Ack, and/or QueryRep/NAK signals. The power control algorithm may adjust the bias setting of the power amplifier to a second, different bias setting during transmission of the unmodulated CW (e.g., during the time periods $T_1$, $T_2$, and/or $T_3$).

The RFID reader according to these techniques still produces a power output at the antenna port that is the same across the Tx and Rx modes of operation, and that is the same power output as expected in traditional RFID reader operations (e.g., 30 dBm). However, the RFID reader operating according to techniques of this disclosure has a lesser power consumption in the Rx mode as compared to the Tx mode. With the Rx mode amounting to approximately 80% of the RFID reader processing cycle, an RFID reader operating according to the techniques of this disclosure uses significantly less energy than would be used by an RFID reader transmitting the same waveforms without adjustment of the amplifier bias setting. The present disclosure estimates that, in practical use cases involving an operator using a battery powered handheld RFID reader over a duration of use (e.g., a six-, eight-, or ten-hour work shift in an inventory tracking environment), use of the techniques of this disclosure may extend the single-charge battery lifetime of the RFID reader by approximately 20%, though the exact value will vary based on the particular use case.

The signal transmissions depicted in FIGS. 1 and 2 and otherwise described in this disclosure may utilize any of various radio frequencies, for example in the low frequency (LF) range (30-500 kilohertz (KHz), or more particularly 125-134 KHz), the high frequency (HF) range (3-30 megahertz (MHz), or more particularly 13.56 MHZ), the ultra-high frequency (UHF) range (300-960 MHZ, or more particularly 433 MHz), and/or microwave frequencies (e.g., 2.45 gigahertz (GHz) or 5.6 GHz).

Further information regarding RFID systems, including commands, communications, and computing architectures traditionally involved therein, may be found in the specification for RFID air interfaces (GS1 Global. (2015). *EPC™ Radio-Frequency Identity Protocols Generation-2 UHF RFID*. https[colon]//www[dot]gs1[dot]org/sites/default/files/docs/epc/uhfc1g2_2_0_0_standard_20131101[dot]pdf).

Example RFID Reader Architecture

Figure 3:
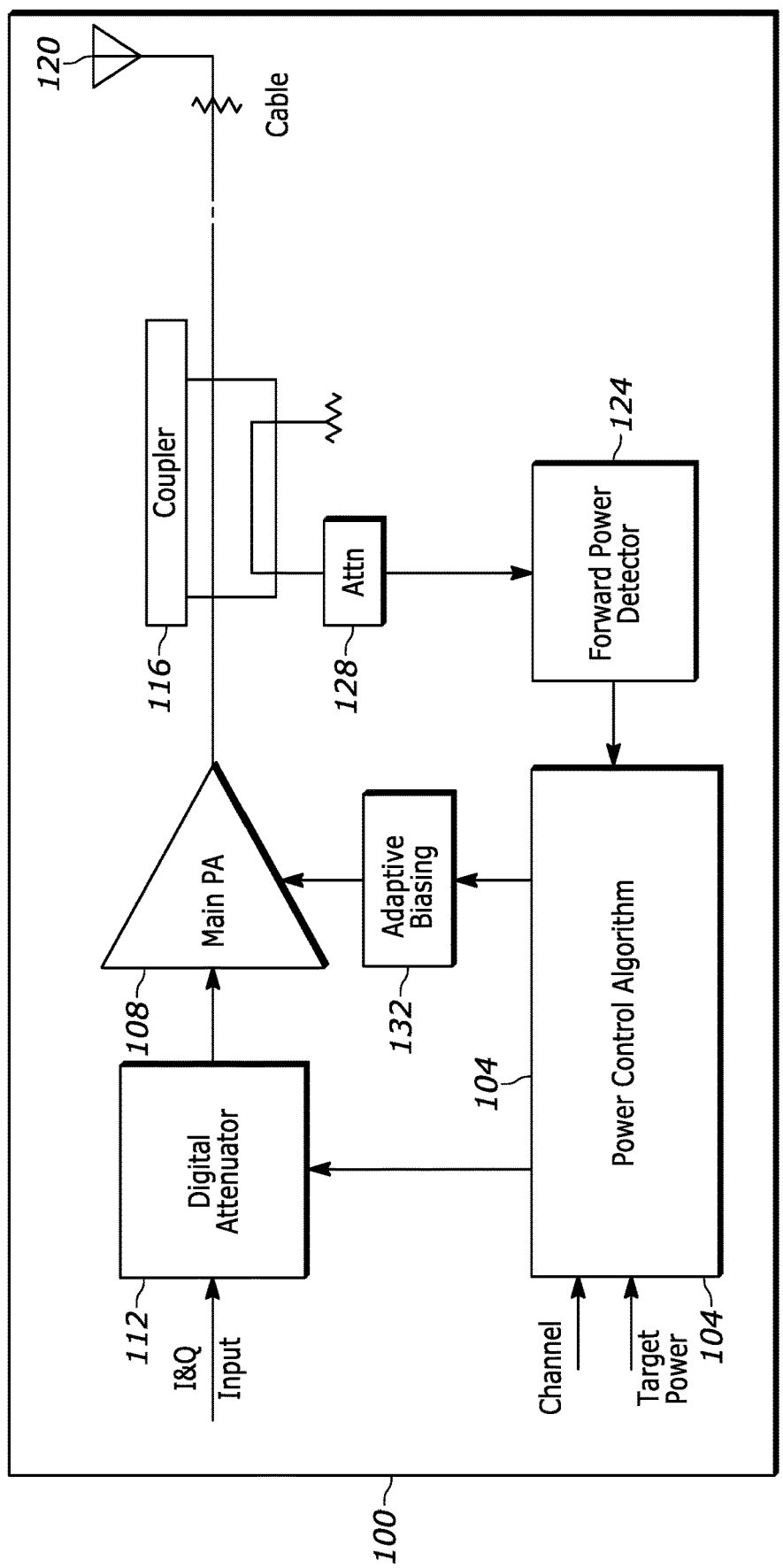
FIG. 3 depicts a block diagram of an example architecture of an RFID reader with adaptive biasing of a power amplifier by a power control algorithm, in accordance with various embodiments described herein.
Figure 4:
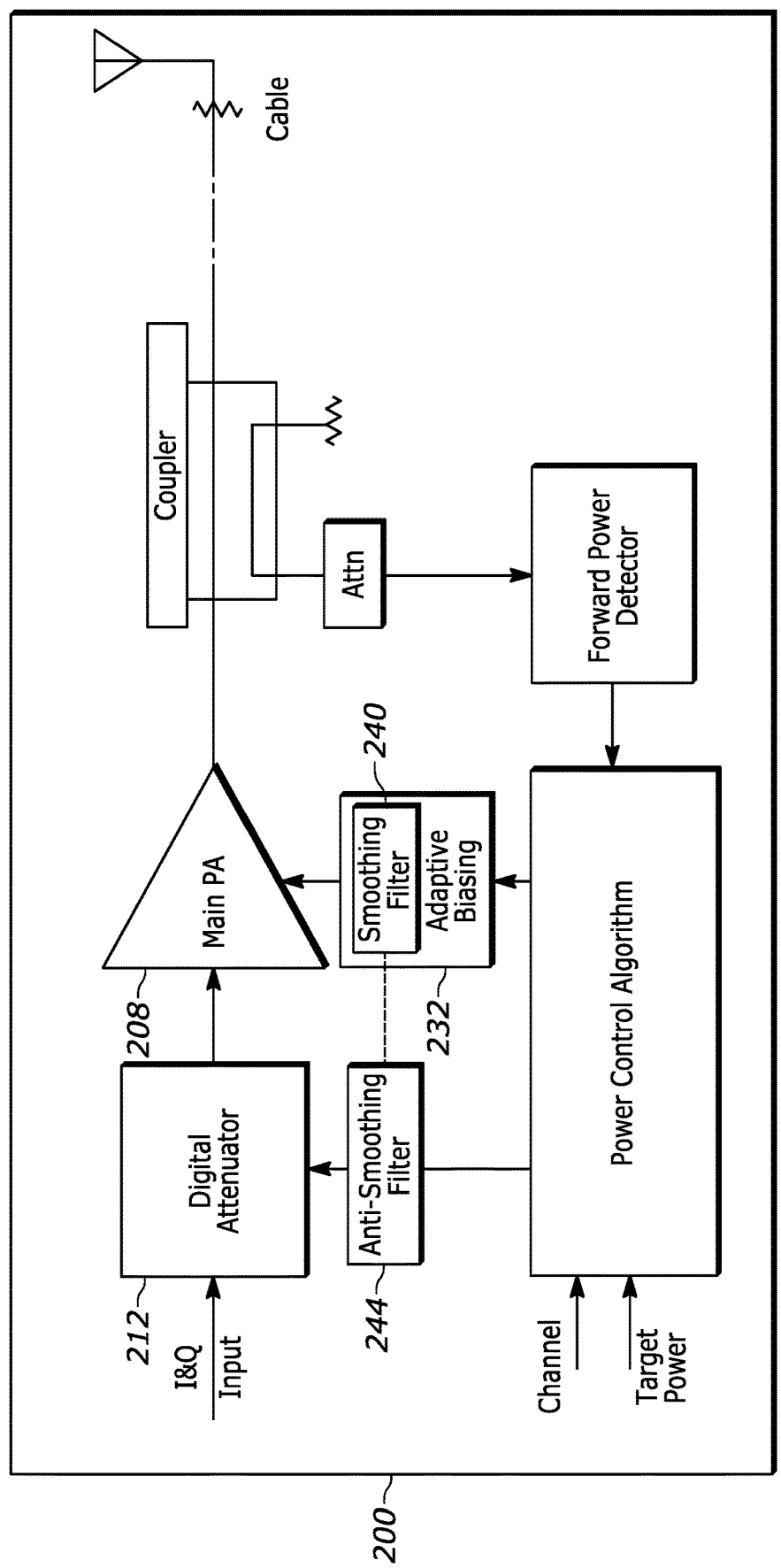
FIG. 4 depicts a block diagram of another example architecture of an RFID reader with adaptive biasing of a power amplifier using dynamic gain equalization, in accordance with various embodiments described herein.
Figure 5:
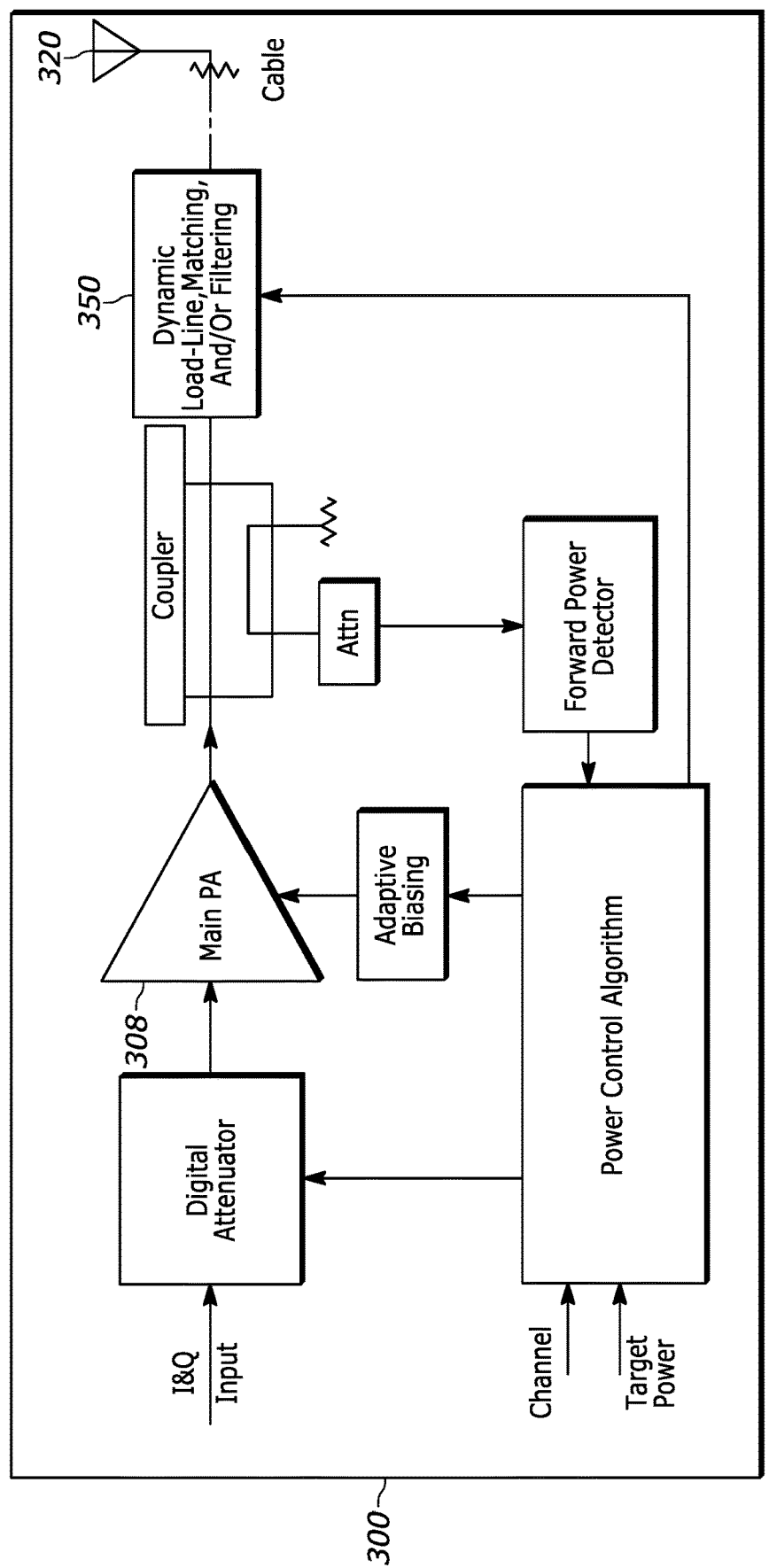
FIG. 5 depicts a block diagram of still another example architecture of an RFID reader with adaptive biasing of a power amplifier using dynamic load line adjustment, dynamic matching and/or filtering, in accordance with various embodiments described herein.

FIGS. 3, 4, and 5 depict block diagrams of example architectures of RFID readers implementing adjustments to a power amplifier bias, in accordance with various possible embodiments.

FIG. 3 depicts a block diagram first example architecture of an RFID reader 100. The architecture of the RFID reader 100 includes a power control algorithm 104. The power control algorithm 104 implementing techniques of this disclosure causes a bias setting of a main power amplifier (PA) 108 of the RFID reader 100 to be set at a first bias setting at a first time period(s) when the RFID reader 100 transmits a modulated continuous waveform (CW), and a second, different bias setting at a second, different time period(s) when the RFID reader transmits an unmodulated CW.

More particularly, the power control algorithm 104 may receive a first input indicating a target channel for RFID transmissions by the RFID reader, and a second input indicating a target power for the RFID transmissions. The target channel may, for example, be a signal frequency in the LF, HF, or UHF range. The target power may, for example, be approximately 30 dBm, and may be substantially constant throughout operation of the RFID reader.

The RFID reader includes a digital attenuator 112, which receives I and Q inputs defining respective components of a waveform for transmission by the RFID reader 100. The I input may correspond to an in-phase or cosine component, and the Q input may correspond to a quadrature or sine component that is 90 degrees out of phase from the I component. The digital attenuator 112 attenuates the waveform in accordance with an attenuation level specified in an output (e.g., logic signal) of the power control algorithm 104, and provides an attenuated signal as an input to the main PA 108. The main PA 108 amplifies the signal to achieve the target output power and provides the amplified signal along a cable via a coupler 116 to an antenna 120 for transmission. The coupler 116 connects the output of the main PA 108 to a forward power detector 124 by way of a secondary attenuator 128. The antenna 120 may be a Tx/Rx antenna, or alternatively, separate antenna elements may be provided for Tx and Rx.

The forward power detector 124 obtains, by way of the secondary attenuator 128, an indication of an actual power output of the main PA 108. The forward power detector 124 provides the indication of the actual power output to the power control algorithm 104, which compares the actual power output to the target power and maintains or corrects for the target power in subsequent operation through output to the digital attenuator 112, effectively completing a power control/feedback loop of the RFID reader 100. This power control algorithm 104 may, for example, include a gain selection table and/or look up table, and may control subsequent operations by matching the measured forward power to values in the gain selection table and/or look up table to choose a gain selection for the main PA 108 that achieves the target output power.

In accordance with techniques of the present disclosure, the RFID reader 100 further includes an adaptive biasing circuit 132, which provides an output causing a bias setting for the main PA 108 to be adjusted based on whether the RFID reader 100 is transmitting the modulated CW or the unmodulated CW. Particularly, the adaptive biasing circuit 132 adjusts the bias setting to a higher value (e.g., 5 V) when the RFID reader 100 is transmitting the modulated CW encoding information for RFID tags, and a lower value (e.g., 3 V) when the RFID reader is transmitting the unmodulated CW that does not encode meaningful information. In some aspects, the higher and lower values for the bias setting are stored at the adaptive biasing circuit 132. In other aspects, the higher and lower values may be stored at the power control algorithm 104, which may instruct the adaptive biasing component of values at which to set the bias setting at any particular time. In still other aspects, the high and low bias setting values may be stored at the main PA 108, and the adaptive biasing circuit 132 may for example provide an output to the main PA 108 indicating which of the higher or lower value to use at any particular time.

In any case, the main PA 108 may produce substantially a same output power (e.g., 30 dBm) regardless of whether the higher or lower bias setting is used, so as to keep power output substantially constant throughout operation of the RFID reader 100. The main PA 108 may operate as a class AB amplifier while biased at the first bias setting, and as a class C amplifier while biased at the second bias setting. The RFID reader may, in some aspects, include a clock generation circuit, which may track time periods to identify time periods during which to use the higher or lower bias settings and the transitions between the time periods. The clock generation circuit may provide time-based outputs to the power control algorithm 104 to indicate which of the higher and lower bias settings to use at any given time.

In practical terms of signal amplification, the main PA 108 has an optimal operational range of highest linearity, i.e., where the main PA 108 most faithfully amplifies an input signal to a target output power without altering (i.e., distorting) the content of the signal. Using the first, higher bias setting as described herein causes the main PA to operate within this highest-linearity range (or at least, comparatively closer to the optimal range). Higher linearity is particularly useful when the RFID reader 100 is to transmit the modulated CW conveying commands that need to be faithfully received at RFID tags (Tx mode).

By comparison, operation of the main PA 108 outside of the optimal range drives the main PA into compression (i.e., compressing the output signal), reducing the integrity of the output signal. However, the present disclosure observes that driving the main PA 108 into more compression attains more power efficiency, and loss of signal integrity is acceptable during time periods when the RFID reader transmits the unmodulated CW that does not convey meaningful information (Rx mode). Thus, using the second, lower bias setting as described herein causes the PA to operate outside the highest-linearity range (or further outside the highest-linearity range, as compared to using the first bias setting).

In view of the above, time-based adjustment of the main PA 108 bias setting yields less energy usage and less heat dissipation by the RFID reader, particularly during the Rx mode when the RFID reader transmits the unmodulated CW.

Functional components of the RFID reader, such as the power control algorithm 104 and/or forward power detector 124, may be understood as being implemented by one or more processors executing instructions stored at one or more memories (e.g., non-transitory memory) of the RFID reader 100 or otherwise operatively connected to the RFID reader 100. In embodiments, certain components in the RFID reader 100 may be combined. For example, the adaptive biasing circuit 132 may be combined with the power control algorithm 104 and/or the main PA 108.

Example RFID Reader Architecture with Dynamic Gain Equalization

Referring again to FIG. 3, it is observed that step adjustments of the bias setting by the adaptive biasing circuit 132 may produce undesirable effects on output of the RFID reader 100. Particularly, instantaneous or near-instantaneous adjustment of the main PA 108 bias between the higher and lower settings (e.g., from 5 V to 3 V, or vice versa) may cause (1) spectral splattering of the signal output frequency from the main PA 108, and/or (2) abrupt deviations in the output power of the main PA 108, potentially compromising the ability of the RFID reader 100 to achieve and maintain the target power.

In view of these challenges, FIG. 4 depicts of a block diagram of another example architecture of an RFID reader 200 configured to avoid step changes when adjusting the main PA bias setting, in accordance with some embodiments. Where similar components to those described with regard to FIG. 3 are shown in FIG. 4, it should be understood that the components may operate in a similar manner as described with respect to FIG. 3, unless indicated otherwise herein.

In the RFID reader 200, an adaptive biasing circuit 232 includes a smoothing filter 240 configured to smooth transitions between the higher and lower bias settings of a main power amplifier (PA) 208. To counteract the smoothing behavior from the smoothing filter 240, an anti-smoothing filter 244 simultaneously adjusts a digital attenuator 212 of the RFID reader 200 in an opposite direction, thereby equalizing an overall gain from input to the digital attenuator 212 to output of the main PA 208. Thus, the smoothing and anti-smoothing response during changes between bias settings of the main PA 208 preserves substantially constant output power and reduces the spectral scattering effect from the main PA 208.

Example RFID Reader Architecture with Dynamic Load-Line, Matching, and/or Filtering Referring back to FIG. 3, the present disclosure contemplates that, upon changes to the bias setting of the main PA 108, a load-line of the main PA 108 output may significantly shift, reducing power efficiency of the main PA 108 output and thus potentially mitigating benefits proposed herein.

To address these challenges, FIG. 5 depicts a block diagram of still another example architecture of an RFID reader 300, in accordance with some embodiments. Where similar components to those described with regard to FIGS. 3 and/or 4 are shown in FIG. 5, it should be understood that the components may operate in a similar manner as described with respect to FIGS. 3 and/or 4, unless indicated otherwise herein.

As depicted in FIG. 5, output from a main power amplifier (PA) 308 is provided to a dynamic load-line, matching, and/or filtering module 350 for further dynamic adjustment before provision to an antenna 320. The module 350 may, for example, be embodied by computer executable instructions stored at one or more non-transitory memories of the RFID reader 300 and executed by one or more processors of the RFID reader 300.

In some aspects, the module 350 implements load-line analysis of the output of the main PA 308. Additionally or alternatively, in some aspects, the module 350 implements voltage matching. Still additionally or alternatively, the module 350 may perform filtering of the main PA 308 output. Accordingly, the module 350 may perform at least one of (1) impedance matching of output of the main PA 308, (2) harmonic rejection of frequencies in output of the main PA 308, and/or (3) impedance matching at a port of the antenna 320.

In some aspects, the techniques of the dynamic load-line, matching and/or filtering module 350 may be implemented in combination with the smoothing and anti-smoothing techniques of the RFID reader 200 from FIG. 4.

Example Environment Including Assembly and Receiver

Figure 6:
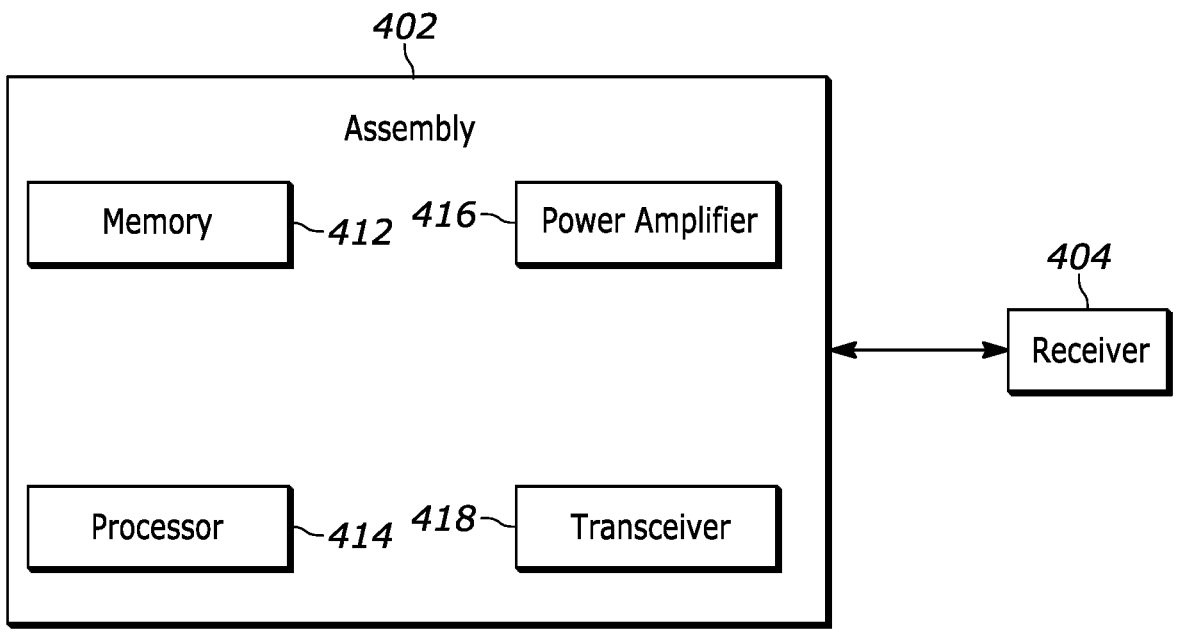
FIG. 6 depicts a block diagram of an example environment including an assembly and a receiver, in accordance with various embodiments described herein.

FIG. 6 depicts a block diagram of an example environment 400, components of which may be configured to implement adaptive biasing techniques of this disclosure.

The environment 400 includes an assembly 402, which may for example be at least a portion of an RFID reader, e.g., as described with respect to FIGS. 1, 2, 3, 4, and/or 5. The environment 400 also includes a receiver 404 configured to receive signals transmitted by the assembly 402 via communications represented by the arrow connecting the assembly 402 and the receiver 404. The receiver 404 may, for example, be an RFID tag including an antenna connected to an integrated circuit. In some aspects, the receiver 404 may be an RFID tag including still additional components, e.g., a battery and/or one or more sensors. Although only one receiver 404 is depicted in FIG. 6, the environment 400 may include two, three, four or more receivers 404 (e.g., multiple RFID tags in the environment 400).

The assembly 402 includes a memory 412 (i.e., one or more memories, such as one or more non-transitory memories). The memory 412 stores instructions that, when executed by a processor 414 (i.e., one or more processors), cause the assembly 402 to perform actions attributed thereto (e.g., actions of one or more RFID readers described in this disclosure). These actions of the assembly 402 may include amplification of an input signal via a power amplifier 416, and transmission of the amplified signal via a transceiver 418 (e.g., one or more antennas). The assembly 402 may further include any of the RFID reader circuitry and/or other components described with respect to FIGS. 3, 4, and/or 5. Transmission of signals between the transceiver 418 and an antenna of the receiver 404 may correspond to RFID communications between the assembly 402 and the receiver 404.

The environment 400 may include still additional and/or alternate components, in various possible aspects.

Example Method

Figure 7:
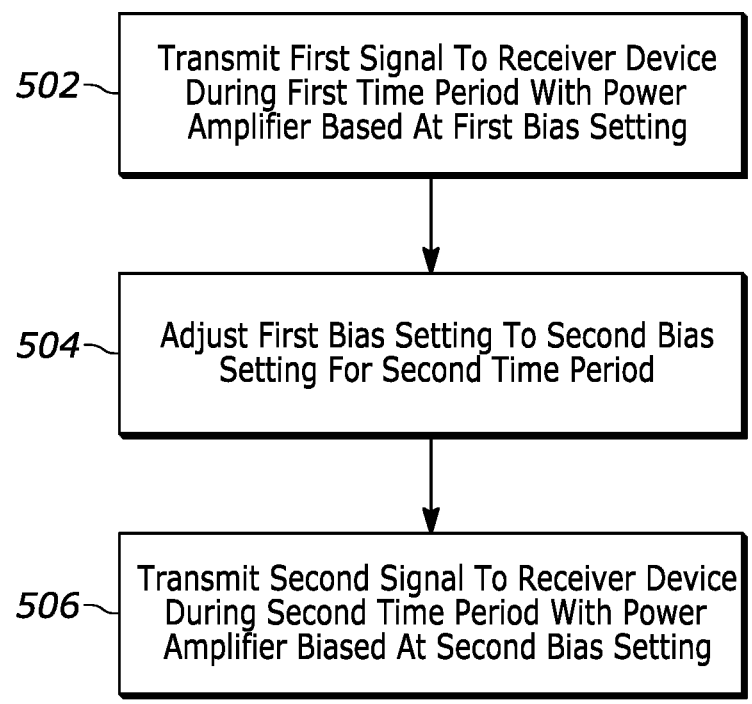
FIG. 7 depicts a block diagram of an example method, in accordance with various embodiments described herein.

FIG. 7 depicts a block diagram of an example method 500, in accordance with some embodiments of the present disclosure. Actions of the method 500 may be implemented, for example, by an assembly such as the RFID reader 100 of FIG. 3, the RFID reader 200 of FIG. 4, the RFID reader 300 of FIG. 5, and/or the assembly 402 of FIG. 6 (e.g., via one or more processors of the assembly executing instructions stored at one or more non-transitory memories of the assembly). Particularly, in some aspects, the method of FIG. 7 is implemented in an assembly (e.g., an RFID reader) via one or more processors executing instructions stored on one or more memories communicatively coupled to the one or more processors.

The method 500 includes transmitting, by a transceiver of the assembly, a first signal to a receiver device (502, e.g., to an RFID tag). Particularly, the assembly transmits the first signal during a first time period, during which a power amplifier of the assembly is biased at a first bias setting. The method 500 further includes adjusting, by a power control algorithm during a second time period that is different than the first time period, the first bias setting to a second bias setting that is different from the first bias setting (504). That is, the bias setting is adjusted to be used during the second time period. The method 500 still further includes transmitting, by the transceiver, a second signal to the receiver device during the second time period while the power amplifier is biased at the second bias setting (506).

In some aspects, the first signal is a modulated continuous waveform (CW) and the second signal is an unmodulated CW. The modulated CW may correspond, for example, to commands transmitted by an RFID reader, and the unmodulated CW may correspond to transmissions by the RFID reader that do not convey commands. The first bias setting may, for example, be a voltage bias of approximately 5 V, and the second bias setting may, for example, be approximately 3 V.

In some aspects, the method 500 further includes (1) responsive to transmitting the second signal to the receiver device, adjusting, by the power control algorithm during a third time period that is different than the first time period and the second time period, the second bias setting to the first bias setting, (2) transmitting, by the transceiver, a third signal to the receiver device during the third time period while the power amplifier is biased at the first bias setting, and/or (3) responsive to completing transmission of the third signal to the receiver device, adjusting, by the power control algorithm during a fourth time period that is different than the first time period, the second time period, and the third time period, the first bias setting to the second bias setting. For example, in contemplated aspects, the bias of the power amplifier may continue to be adjusted between the first and the second bias setting according to whether an RFID reader is in a Tx mode (transmitting a modulated CW) or an Rx module (transmitting an unmodulated CW).

In some aspects, the method 500 further includes (1) tracking, via a clock generation circuit of the assembly, the first time period and the second time period to identify respective transition points of the first time period and the second time period, (2) responsive to identifying a first transition point of the first time period to the second time period, causing, by the clock generation circuit, the power control algorithm to adjust the first bias setting to the second bias setting, (3) responsive to identifying a second transition point of the second time period to a third time period, causing, by the clock generation circuit, the power control algorithm to adjust the second bias setting to the first bias setting, and/or (4) transmitting, by the transceiver, a third signal to the receiver device during the third time period while the power amplifier is biased at the first bias setting.

In some aspects, the method 500 further includes adjusting, by the power control algorithm, the first bias setting to the second bias setting by (1) increasing, by a smoothing filter of the assembly, a first biasing level of an adaptive biasing circuit of the assembly, and/or (2) decreasing, by an anti-smoothing filter of the assembly, a second biasing level of an attenuator of the assembly. In these aspects, the method 500 may still further include adjusting, by the power control algorithm, the first bias setting to the second bias setting by (1) receiving, from a power detector of the assembly, an output power measurement of the power amplifier at the first bias setting, and (2) adjusting, by the anti-smoothing filter, the second biasing level of the attenuator to maintain the output power measurement of the power amplifier while biased at the second bias setting.

In some aspects, the method 500 further includes adjusting, by the power control algorithm, the first bias setting to the second bias setting by (1) decreasing, by a smoothing filter of the assembly, a first biasing level of an adaptive biasing circuit of the assembly, and (2) increasing, by an anti-smoothing filter of the assembly, a second biasing level of an attenuator of the assembly. In these aspects, the method 500 may still further include adjusting, by the power control algorithm, the first bias setting to the second bias setting by (1) receiving, from a power detector of the assembly, an output power measurement of the power amplifier at the first bias setting, and (2) adjusting, by the anti-smoothing filter, the second biasing level of the attenuator to maintain the output power measurement of the power amplifier while biased at the second bias setting.

In some aspects, the method 500 further includes performing, by one or more of: (i) a dynamic load-line module, (ii) a dynamic voltage matching module, or (iii) a dynamic voltage filtering module, at least one of (a) output impedance matching, (b) harmonic rejection, or (c) antenna port impedance matching.

The method 500 may include still additional and/or alternate actions, including any suitable actions described in this disclosure, in various possible aspects. The method 500 may include fewer actions, in some possible aspects.

Additional Considerations

Portions of the present disclosure describe RFID communication techniques most commonly associated with passive RFID tags, which traditionally do not have an internal power source and must be energized by the interrogation signal from an RFID reader to transmit signals back to the RFID reader. However, it should be appreciated that benefits attributed to techniques of this disclosure (e.g., decreased power consumption by the RFID reader) may still be achieved to at least some extent in RFID systems involving semi-passive RFID tags and/or active RFID tags. For example, although semi-active RFID tags may have an internal battery, semi-active RFID tags rely upon substantially the same principle as RFID tags, only transmitting signals to the RFID reader upon energization via the interrogation signal. Thus, the processing cycles of the RFID reader and the energy savings techniques proposed by this disclosure are substantially similar for passive and semi-passive RFID tags. Although active RFID tags transmit signals detectable by the RFID reader regardless of whether or not the RFID reader transmits an interrogation signal, RFID reader processing cycles for active RFID tags are still involve at least some time period(s) during which the RFID reader transmits an unmodulated CW (e.g., during time period $T_3$ from FIG. 1, after acknowledging the RN16 and while awaiting the identifying information from the RFID tag).

In the foregoing specification, specific embodiments/aspects have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations/aspects should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations/aspects.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. An assembly comprising:
a power amplifier;
a transceiver;
one or more processors; and
one or more memories communicatively coupled to the one or more processors storing instructions that, when executed by the one or more processors, cause the assembly to:
transmit, by the transceiver, a first signal to a receiver device during a first time period while the power amplifier is biased at a first bias setting,
adjust, by a power control algorithm during a second time period that is different than the first time period, the first bias setting to a second bias setting that is different from the first bias setting,
transmit, by the transceiver, a second signal to the receiver device during the second time period while the power amplifier is biased at the second bias setting,
responsive to transmitting the second signal to the receiver device, adjust, by the power control algorithm during a third time period that is different than the first time period and the second time period, the second bias setting to the first bias setting,
transmit, by the transceiver, a third signal to the receiver device during the third time period while the power amplifier is biased at the first bias setting, and
responsive to completing transmission of the third signal to the receiver device, adjust, by the power control algorithm during a fourth time period that is different than the first time period, the second time period, and the third time period, the first bias setting to the second bias setting, wherein the first signal is a modulated continuous waveform and the second signal is an unmodulated continuous waveform.

2. The assembly of claim 1, further comprising a clock generation circuit, and wherein the instructions further cause the assembly to:
track, via the clock generation circuit, the first time period and the second time period to identify respective transition points of the first time period and the second time period,
responsive to identifying a first transition point of the first time period to the second time period, cause, by the clock generation circuit, the power control algorithm to adjust the first bias setting to the second bias setting,
responsive to identifying a second transition point of the second time period to a third time period, cause, by the clock generation circuit, the power control algorithm to adjust the second bias setting to the first bias setting, and
transmit, by the transceiver, a third signal to the receiver device during the third time period while the power amplifier is biased at the first bias setting.

3. The assembly of claim 1, further comprising:
an attenuator with an anti-smoothing filter; and
an adaptive biasing circuit with a smoothing filter, and
wherein the instructions further cause the assembly to adjust, by the power control algorithm, the first bias setting to the second bias setting by:
increasing, by the smoothing filter, a first biasing level of the adaptive biasing circuit, and
decreasing, by the anti-smoothing filter, a second biasing level of the attenuator.

4. The assembly of claim 3, further comprising a power detector, and wherein the instructions further cause the assembly to adjust, by the power control algorithm, the first bias setting to the second bias setting by:
receiving, from the power detector, an output power measurement of the power amplifier at the first bias setting; and
adjusting, by the anti-smoothing filter, the second biasing level of the attenuator to maintain the output power measurement of the power amplifier while biased at the second bias setting.

5. The assembly of claim 1, further comprising:
an attenuator with an anti-smoothing filter; and
an adaptive biasing circuit with a smoothing filter, and
wherein the instructions further cause the assembly to adjust, by the power control algorithm, the first bias setting to the second bias setting by:
decreasing, by the smoothing filter, a first biasing level of the adaptive biasing circuit, and
increasing, by the anti-smoothing filter, a second biasing level of the attenuator.

6. The assembly of claim 5, further comprising a power detector, and wherein the instructions further cause the assembly to adjust, by the power control algorithm, the first bias setting to the second bias setting by:
receiving, from the power detector, an output power measurement of the power amplifier at the first bias setting; and
adjusting, by the anti-smoothing filter, the second biasing level of the attenuator to maintain the output power measurement of the power amplifier while biased at the second bias setting.

7. The assembly of claim 1, further comprising one or more of: (i) a dynamic load-line module, (ii) a dynamic voltage matching module, or (iii) a dynamic voltage filtering module to perform at least one of (a) output impedance matching, (b) harmonic rejection, or (c) antenna port impedance matching.

8. A method comprising:
transmitting, by a transceiver, a first signal to a receiver device during a first time period while a power amplifier is biased at a first bias setting;
adjusting, by a power control algorithm during a second time period that is different than the first time period, the first bias setting to a second bias setting that is different from the first bias setting;
transmitting, by the transceiver, a second signal to the receiver device during the second time period while the power amplifier is biased at the second bias settings
responsive to transmitting the second signal to the receiver device, adjusting, by the power control algorithm during a third time period that is different than the first time period and the second time period, the second bias setting to the first bias setting;
transmitting, by the transceiver, a third signal to the receiver device during the third time period while the power amplifier is biased at the first bias setting; and responsive to completing transmission of the third signal to the receiver device, adjusting, by the power control algorithm during a fourth time period that is different than the first time period, the second time period, and the third time period, the first bias setting to the second bias setting, wherein the first signal is a modulated continuous waveform and the second signal is an unmodulated continuous waveform.

9. The method of claim 8, further comprising:

tracking, via a clock generation circuit, the first time period and the second time period to identify respective transition points of the first time period and the second time period;

responsive to identifying a first transition point of the first time period to the second time period, causing, by the clock generation circuit, the power control algorithm to adjust the first bias setting to the second bias setting;

responsive to identifying a second transition point of the second time period to a third time period, causing, by the clock generation circuit, the power control algorithm to adjust the second bias setting to the first bias setting; and transmitting, by the transceiver, a third signal to the receiver device during the third time period while the power amplifier is biased at the first bias setting.

10. The method of claim 8, further comprising adjusting, by the power control algorithm, the first bias setting to the second bias setting by:

increasing, by a smoothing filter, a first biasing level of an adaptive biasing circuit; and decreasing, by an anti-smoothing filter, a second biasing level of an attenuator.

11. The method of claim 10, further comprising adjusting, by the power control algorithm, the first bias setting to the second bias setting by:

receiving, from a power detector, an output power measurement of the power amplifier at the first bias setting; and adjusting, by the anti-smoothing filter, the second biasing level of the attenuator to maintain the output power measurement of the power amplifier while biased at the second bias setting.

12. The method of claim 8, further comprising adjusting, by the power control algorithm, the first bias setting to the second bias setting by:

decreasing, by a smoothing filter, a first biasing level of an adaptive biasing circuit; and increasing, by an anti-smoothing filter, a second biasing level of an attenuator.

13. The method of claim 12, further comprising adjusting, by the power control algorithm, the first bias setting to the second bias setting by:

receiving, from a power detector, an output power measurement of the power amplifier at the first bias setting; and adjusting, by the anti-smoothing filter, the second biasing level of the attenuator to maintain the output power measurement of the power amplifier while biased at the second bias setting.

14. The method of claim 8, further comprising:

performing, by one or more of: (i) a dynamic load-line module, (ii) a dynamic voltage matching module, or (iii) a dynamic voltage filtering module, at least one of (a) output impedance matching, (b) harmonic rejection, or (c) antenna port impedance matching.

* * * * *